Feb. 3, 1959　　　　　H. P. HALL　　　　　2,872,639
ELECTRICAL BRIDGE AND METHOD
Filed Oct. 19, 1956　　　　　　　　　　　　4 Sheets-Sheet 1

Inventor
Henry P. Hall
by Rines and Rines
Attorneys

Feb. 3, 1959 — H. P. HALL — 2,872,639
ELECTRICAL BRIDGE AND METHOD
Filed Oct. 19, 1956 — 4 Sheets-Sheet 2

Inventor
Henry P. Hall
by Rines and Rines
Attorneys

Inventor
Henry P. Hall
by Rines and Rines
Attorneys

Feb. 3, 1959

H. P. HALL 2,872,639

ELECTRICAL BRIDGE AND METHOD

Filed Oct. 19, 1956

LOCUS OF THE POINT M ($R_s+jX_s$) ON THE COMPLEX
IMPEDANCE PLANE AS THE BRIDGE IS BALANCED BY ADJUSTMENT OF M AND $R_s$

*INVENTOR.*
HENRY P. HALL
BY *Rines and Rines*
ATTORNEYS

2,872,639
ELECTRICAL BRIDGE AND METHOD

Henry P. Hall, Lincoln, Mass., assignor to General Radio Company, Cambridge, Mass., a corporation of Massachusetts Application October 19, 1956, Serial No. 617,049

10 Claims. (Cl. 324—57)

The present invention relates to electrical bridges and, more particularly, to bridges of the alternating-current type.

Numerous bridge configurations have been evolved for measuring the real and imaginary components of complex impedance elements of unknown impedance. Such an unknown element is inserted into an arm of the bridge. Other known impedance elements are disposed in other arms of the bridge and they are adjusted to obtain a balance or null condition. Through the degree of adjustment of the known elements necessary to obtain such a balance or null condition, the real and imaginary components of the unknown impedance element-to-be-measured may be ascertained. In many such bridges, the adjustments of the bridge arms to obtain a balance or null condition involve a series of successive multiple adjustments, later more fully explained, which is referred to as a "sliding-null" balance condition. Such adjustments are, of course, time-consuming and rather difficult.

An object of the present invention, accordingly, is to provide a new and improved bridge and method that substantially eliminate sliding-null balance adjustments and, to the contrary, provide for the direct and rapid reaching of a null condition.

To achieve this object, bridge circuits that would normally balance in a non-orthogonal manner, as hereinafter described, are made to balance in a substantially orthogonal manner. In summary, this type of balance may be attained by varying, for example, the resistance of a first variable resistor in one of the bridge arms so that its variation causes the simultaneous variation of a second variable resistor in a second arm of the bridge in such a manner as to render substantially constant a product having as terms the resistances of the said resistors or reciprocals thereof, and varying the second variable resistor so that its adjustment does not affect the resistance of the first variable resistor.

A further object is to provide new and improved alternating-current bridges.

Other and further objects will be explained hereinafter and will be more particularly pointed out in the appended claims.

The invention will now be described in connection with the accompanying drawings, Fig. 1 of which is a side elevation of bridge apparatus arranged and constructed in accordance with a preferred embodiment thereof and connected into a bridge circuit;

Figure 1:
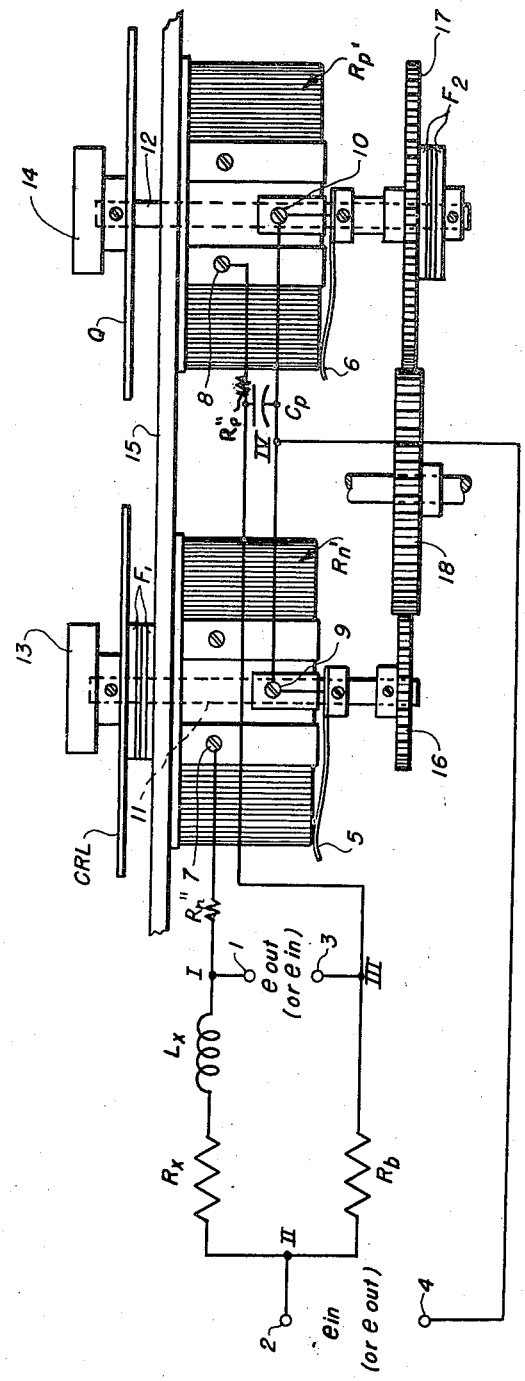
Figure 2:
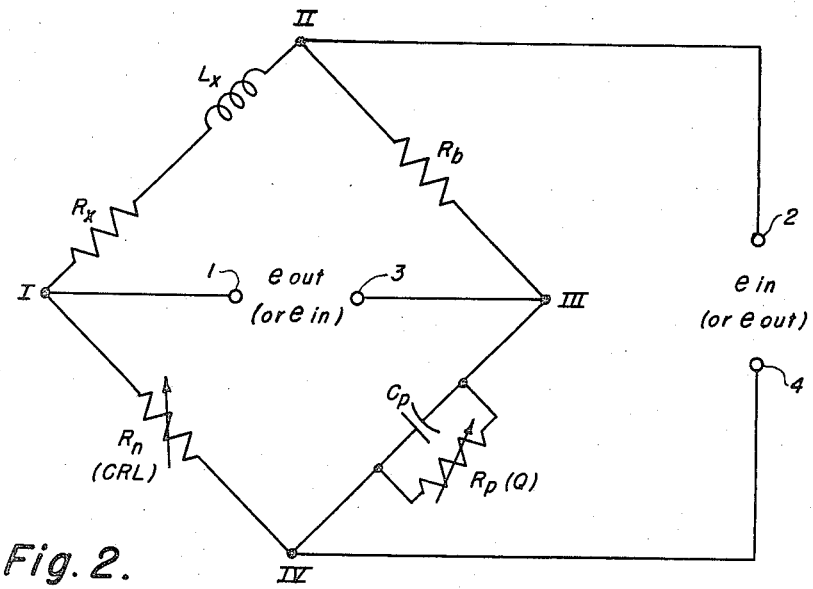
Fig. 2 is a schematic circuit diagram of the bridge of Fig. 1.

Referring, first, to the four-arm Maxwell type of inductance bridge shown in Figs. 1 and 2, an unknown complex impedance, having an unknown real or resistive component $R_x$ and an unknown imaginary part illustrated as an inductance $L_x$ of impedance $X_x$ equal to $j\omega L_x$, where $j=\sqrt{-1}$ and $\omega$ is the angular frequency of the alternating-current voltage $e_{in}$ energizing the bridge, is disposed in the bridge arm between the vertices I and II. The so-called ratio arm between the vertices II and III comprises the fixed known resistor $R_b$. A known capacitor $C_p$ is connected in the third arm between the vertices III and IV, being shunted by a variable resistor $R_p$, the dial or scale of which may be calibrated in terms of the storage factor Q; namely, the ratio of reactance-to-resistance. The remaining arm between the vertices IV and I contains a variable resistor $R_n$, the dial or scale of which may be calibrated in inductance. The alternating-current voltage $e_{in}$ may be fed to the terminals 2, 4, between the vertices II and IV and the output voltage from the bridge $e_{out}$ may be obtained at the terminals 1, 3 between the vertices I and III, or vice versa. When a null or balance condition is obtained, $e_{out}$ is zero.

The undesirable sliding-null condition will first be more fully explained in order that the operation of the invention may be clearly understood.

In general, the balance condition of an alternating-current impedance bridge can be represented by the equation:

(1) $\quad R_x+jX_x=M(R_s+jX_s)$

The left-hand side of this equation is composed of the real and imaginary parts of the unknown impedance (or admittance) which is to be determined. The right-hand side of the equation is a function of the three bridge arms that do not contain the unknown, where M is a real coefficient that multiplies both the real quantity $R_s$ and the imaginary quantity $jX_s$. In the circuits of particular interest, the null or balance condition is to be obtained by adjustments of M and $R_s$, and the quantity $X_s$ is constant. It can be seen that a variation in the imaginary quantity $MjX_s$ can only be made by a variation in M which will also result in a variation in the real quantity $MR_s$. If the Q of the unknown, defined as $X_x/R_x$, is less than unity, then, near balance, the ratio $X_s/R_s$ will also be less than unity. A change in M will therefore change the real quantity $MR_s$ by a larger amount than it will change the imaginary quantity $MjX_s$. Since the adjustment of $R_s$ effects only the real quantity $MR_s$, however, adjustments of both M and $R_s$ cause mainly a real-part change when Q is less than unity. The loci of the point $M(R_s+jX_s)$, which correspond to the adjustments of M and $R_s$, are therefore non-orthogonal, and the adjustments are interdependent.

Figure 7:
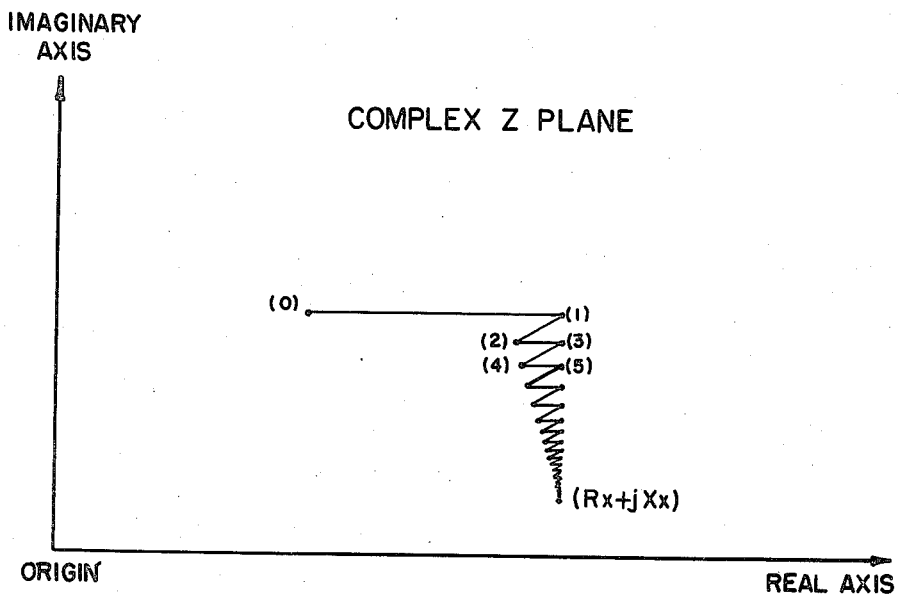
Fig. 7 is an explanatory graph.

The difficulty resulting from this non-orthogonality of adjustment is illustrated in Fig. 7, which illustrates the locus of the point $M(R_s+jX_s)$ on the complex impedance plane as the bridge adjustments are varied to make it coincide with the point $(R_x+jX_x)$ corresponding to the unknown impedance or admittance. The distance between these two points is a measure of the degree of unbalance of the bridge. In proper balancing procedure, successive adjustments of M and $R_s$ are made, each adjustment reducing the unbalance as much as possible. A variation in M will move the point $M(R_s+jX_s)$ along a line that is radial from the origin, and a variation in $R_s$ will move that point along a line parallel to the real axis, illustrated as the abscissa. As $X_s/R_s$ approaches zero, these two possible directions of adjustment approach parallelism.

Several successive posititons of the point $M(R_s+jX_s)$ are numbered in sequence in Fig. 7, starting with an arbitrary position (0). A slowly converging series of adjustments (1), (2), (3), (4), (5) etc. is necessary since the adjustment of neither M nor $R_s$ will move the variable point directly toward the desired $(R_x+jX_x)$ position.

The term "sliding null" is used to describe this slow convergence since it describes the variation in the indicated value of the unknown reactance as read on, for example, a calibrated dial or scale associated with the adjustment M. Since all the adjustments in M are in the same direction, the position of this adjustment, and therefore of its associated dial, moves or slides toward the correct value as the successive adjustments are made. In actual practice, it is sometimes impossible to reach a satisfactory balance, since the improvement in balance for each successive adjustment may be too small to be detected. A variation in either adjustment large enough to be detected may easily cause a greater unbalance, so that the operator may be led to believe that the best balance has been reached, when, in actual fact, the operator has obtained a "false null."

If, however, the terms $MR_s$ and $MjX_s$ could be adjusted independently, the adjustments would be orthogonal, not substantially parallel, the balance could be made rapidly, and the sliding-null condition would be eliminated. This end is achieved in accordance with the present invention, by causing any variation in M simultaneously to effect a variation of $R_s$ in such a way that the product $MR_s$ remains substantially constant. Under such conditions, variation of M will change the imaginary part $jMX_s$ only. By further providing for independent variation of $R_s$ such that the term M does not vary with variation of $R_s$, only the real part $MR_s$ is varied, this adjustment being orthogonal to the change in balance resulting from variation of M, and hence conducive to the attainment of a rapid null balance condition.

Turning, for example, to the specific application of the Maxwell-type bridge of Figs. 1 and 2, Equation 1 may be rewritten as (2) $$R_x + j\omega L_s = R_b R_n \left( \frac{1}{R_p} + j\omega C_p \right)$$

where the product $R_b R_n (1/R_p)$ corresponds to the product $MR_s$ that is to be maintained substantially constant as $R_n$ is varied. The resistor $R_p$, however, is also to be variable independently of $R_n$ so that $R_b R_n j\omega C_p$ is constant while $R_p$ is being varied.

A physical apparatus for satisfying the above conditions is illustrated in Fig. 1 embodying cylindrical logarithmically-wound potentiometers $R_n$ and $R_p$ the respective sliders, brushes or contact members 5 and 6 of which tap off variable resistances between the respective contact terminals 9 and 10 and the respective potentiometer end terminals 7 and 8. In actual practice, the resistors $R_n$ and $R_p$ will comprise respective fixed resistors $R_n''$ and $R_p''$ and variable resistors $R_n'$ and $R_p'$ connected so that the variation in the total resistance of the fixed and variable resistors will vary substantially exponentially with angular adjustment of the respective contact members 5 and 6. The contact members 5 and 6 may be adjusted along the lower edge or track of the windings $R_n$ and $R_p$ by shafts 11 and 12 that are rotatable by respective knobs 13 and 14 mounted above the upper surface of a chassis or panel 15. The before-mentioned CRL and Q dials may be disposed below the knobs 13 and 14. A pair of cooperative friction plates $F_1$, the plates of which are mounted upon the shaft 11 and upon the panel 15, is disposed between the CRL dial and the panel 15 for a purpose that will later be explained. At the bottom of the shaft 11 is mounted a first gear 16. Near the bottom of the shaft 12, a second gear 17 of larger diameter, say twice that of the gear 16, is provided, and a pair of friction plates $F_2$ is disposed therebelow, one of which is mounted upon the underside of the gear 17 and the other, upon the shaft 12. An idler gear 18 couples the gears 16 and 17.

When the knob 13 is rotated, accordingly, to vary the value of $R_n$ (and hence the multiplier M) exponentially, the gear 16 turns and, through the idler coupling gear 18, rotates the gear 17 in the same direction, thereby causing the slider 6 to vary along the exponential potentiometer $R_p$. The value of the product $(R_n)1/R_p$ may therefore be maintained substantially constant during such variation. Since $R_b$ is a constant, the condition of maintaining the product $MR_s$ $$\left( \text{or } \frac{R_b R_n}{R_p} \right)$$

substantially constant has been satisfied. By causing the friction of the friction plates $F_2$ to be materially less than that of the friction plates $F_1$, moreover, and since the friction of the bearing of the shaft 12 is, in turn, much less than that of the friction plates $F_2$, the dial 14 may be rotated to control the slider 6 upon the potentiometer $R_p$ independently of the rotation of the slider 5 upon the potentiometer $R_n$. The further condition of permitting indepednent variation of $R_s$, or $R_p$, has thus also been achieved and substantially orthogonal balance conditions may be obtained.

An exponential relationship between the normalized rotation ($\theta$) and resistance (R) is necessary since only for this type of resistance variation will a given change in rotation ($\Delta\theta$) result in a given fractional change in resistance ($\Delta R/R$) independent of the original value of the variable resistor. In the notation of calculus, this relationship would be written:

(3) $$\frac{dR}{R} = K d\theta$$

or, (4) $$\frac{1}{R}\frac{dR}{d\theta} = K$$

This relationship defines the exponential function $R = R_0 e^{K\theta}$.

If the above relationship holds for each of two variable resistors, $$R_a = R_{0a} e^{K_a \theta_a}$$

and $$R_b = R_{0b} e^{K_b \theta_b}$$

the quotient $R_a/R_b$ will remain constant if changes are made simultaneously in $\theta_a$ and $\theta_b$ such that $K_a \Delta\theta_a = K_b \Delta\theta_b$, as with the aid of proper gearing or other means. Likewise the product $R_a R_b$ will remain constant if simultaneous changes are made such that $K_a \Delta\theta_a = -K_b \Delta\theta_b$.

It should be noted that it is not necessary that the variable resistor itself be exponential, since it would be possible to drive a linear resistor in a nonlinear manner with appropriate nonlinear gears or other means. In this case, the $\theta$ in the exponential relationship would be the rotation of a second shaft rather than the rotation of the shaft of the variable resistor itself.

Figure 3:
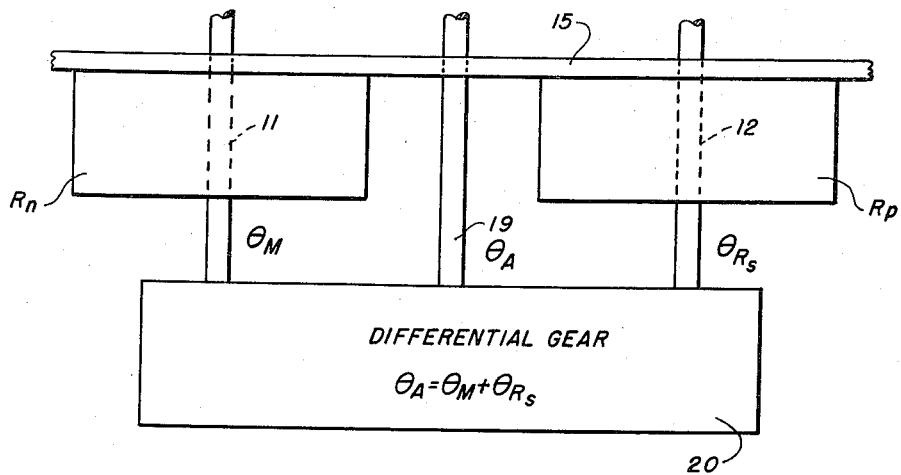
Fig. 3 is a fragmentary view similar to Fig. 1 of a modification.

While the apparatus of Fig. 1 operates through differential friction control, a differential gear or other system may similarly be employed. In Fig. 3, accordingly, the shafts 11 and 12 are shown connected to a conventional differential gear mechanism 20 the third control shaft of which is illustrated at 19. The angular rotation of the shafts 11, 12 and 19 are respectively represented by the symbols $\theta_M$ (corresponding to rotation of the multiplier M or $R_n$ exponential potentiometer), $\theta_{R_s}$ (corresponding to rotation of the $R_s$ or $R_p$ logarithmic potentiometer) and $\theta_A$. The differential gear 20 provides for the relative rotation condition (5) $$\theta_A = \theta_M + \theta_{R_s}$$

If $\theta_A$ is held fixed by holding the shaft 19, and the M or $R_n$ potentiometer is varied, the $R_s$ or $R_p$ potentiometer is varied in the opposite direction, thus maintaining the product $MR_s$ $$\left( \text{or } \frac{R_b R_n}{R_p} \right)$$

substantially constant. If the shaft 19 is rotated, however, and the shaft 11 is held fixed, only the shaft 12 will rotate, independently varying $R_s$ or $$\frac{1}{R_p}$$

Figure 4:
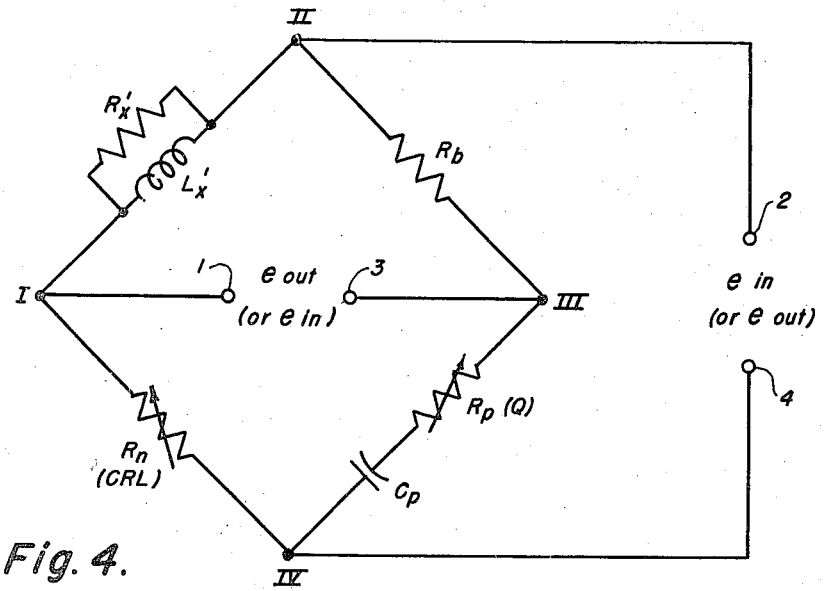
Figs. 4, 5 and 6 are schematic circuit diagrams similar to Fig. 2 of further modified bridge circuits.
Figure 5:
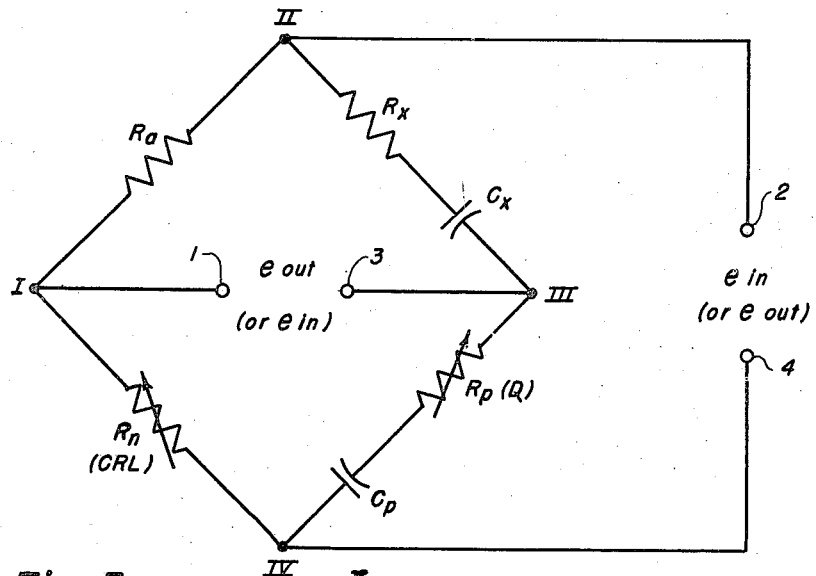

Precisely the same techniques can be employed with other types of alternating-current bridges than the Maxwell inductance type of Figs. 1 and 2. As further illustrations, the balance condition of the Hay inductance bridge of Fig. 4, in which the unknown impedance resistance and reactive parts $R_x'$ and $L_x'$ are connected in shunt in the bridge arm I—II, and the variable resistance $R_p$ and the capacitor $C_p$ are in series in the arm III—IV, may be represented by the equation (6) $\quad \dfrac{1}{R_x'} - \dfrac{j}{\omega L_x'} = \dfrac{1}{R_b R_n}\left(R_p - \dfrac{j}{\omega C_p}\right)$ In such a case, the product $MR_s$ that must be held constant is $$\frac{1}{R_b R_n}(R_p)$$

and $R_p$ again must be variable independently of $R_n$, as before discussed. Still another example is provided by the capacitance bridge of Fig. 5 in which the unknown impedance resistive and capacitive parts $R_x$, $C_x$ are connected in series in the bridge arm II—III and a ratio arm $R_a$ is connected in the arm I—II. The balance condition may be expressed as (7) $\quad R_x - \dfrac{j}{\omega C_x} = \dfrac{R_a}{R_n}\left(R_p - \dfrac{j}{\omega C_p}\right)$ Again, $$\frac{R_a}{R_n}(R_p)$$

will, in accordance with the present invention, be maintained substantially constant as $R_n$ is varied, but $R_p$ may be varied independently thereof.

Figure 6:
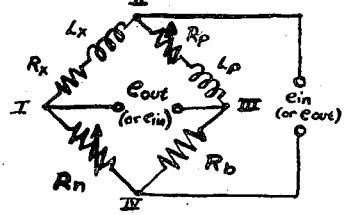

Still another example is the symmetrical inductance bridge of Fig. 6 having the balance equation (8) $\quad R_x + j\omega L_x = \dfrac{R_n}{R_b}(R_p + j\omega L_p)$ and in which it is desired to hold the product $R_n R_p$ constant as $R_n$ is varied.

As a practical illustration, a bridge circuit constructed in accordance with the embodiment of Fig. 1 has been successfully operated with a two-to-one ratio of gears 17 and 16, a ten-to-one exponential potentiometer $R_n$ of resistance value ranging from one thousand to ten thousand ohms, and a hundred-to-one exponential potentiometer $R_p$ having a resistance range of from two hundred ohms to twenty thousand ohms.

It is also to be understood that other types of variable impedance elements than potentiometers may, if desired, be employed such as exponentially variable capacitors or combinations of capacitors and resistors, as but two illustrations.

Further modifications will occur to those skilled in the art and all such are considered to fall within the spirit and scope of the invention as defined in the appended claims.

What is claimed is:

1. In an alternating-current bridge of the type that would normally provide a sliding-null balance condition and in which this balance condition is represented by the generalized expression $$R_x + jX_x = M(R_s + jX_s)$$

where $R_x$ and $jX_x$ are respectively the real part and the imaginary part of an unknown impedance connected into a first arm of the bridge, $j$ is equal to $\sqrt{-1}$, M is a real coefficient, and $R_s$ and $jX_s$ are the real and imaginary parts of a function of the impedances of electrical components of the bridge arms other than the said first arm, means for varying the value of M, means controlled by the variation in the value of M for simultaneously varying the value of $R_s$ so as to maintain the product $MR_s$ substantially constant, and means for varying the value of $R_s$ independently of the means for varying the value of M.

2. In an alternating-current bridge of the type that would normally provide a sliding-null balance condition and in which this balance condition is represented by the generalized expression $$R_x + jX_x = M(R_s + jX_s)$$

where $R_x$ and $jX_x$ are respectively the real part and the imaginary part of an unknown impedance connected into a first arm of the bridge, $j$ is equal to $\sqrt{-1}$, M is a real coefficient the value of which is determined by the setting of a first variable resistance disposed in a second arm of the bridge, and $R_s$ and $jX_s$ are the real and imaginary parts of a function of the impedances of electrical components of bridge arms other than the said first arm with the value of $R_s$ being determined by the setting of a second variable resistance disposed in an arm of the bridge other than the said first and second arms, means for varying the first variable resistance substantially exponentially, thereby to vary the value of M, means controlled by the variation of the first variable resistance for simultaneously varying the second variable resistance substantially exponentially so as to maintain the product $MR_s$ substantially constant, and means for varying the second variable resistance independently of the variation of the first variable resistance.

3. In a four-arm alternating-current bridge of the type that would normally provide a sliding-null balance condition and in which this balance condition is represented by the expression $$R_x + j\omega L_x = R_b R_n\left[\frac{1}{R_p} + j\omega C_p\right]$$

where $R_x$ and $j\omega L_x$ are respectively the real part and the imaginary part of an unknown impedance connected into a first arm of the bridge, $j$ is equal to $\sqrt{-1}$, $\omega$ is the alternating-current angular frequency, $R_b$ is a resistance disposed in a second arm of the bridge, $R_n$ is a first variable resistance disposed in a third arm of the bridge, and $R_p$ and $C_p$ are respectively a second variable resistance and a shunt-connected capacitance disposed in the fourth arm of the bridge, means for varying the first variable resistance $R_n$, means controlled by the variation of the first variable resistance $R_n$ for simultaneously varying the second variable resistance $R_p$ so as to maintain the product $$R_b R_n\left(\frac{1}{R_p}\right)$$

substantially constant, and means for varying the second variable resistance $R_p$ independently of the variation of the first variable resistance $R_n$.

4. In a four-arm alternating-current bridge of the type that would normally provide a sliding-null balance condition and in which this balance condition is represented by the expression $$\frac{1}{R_x'} - \frac{j}{\omega L_x'} = \frac{1}{R_b R_n}\left(R_p - \frac{j}{\omega C_p}\right)$$

where $$\frac{1}{R_x'}$$

and $$\frac{j}{\omega L_x'}$$

are respectively the real part and the imaginary part of an unknown impedance connected into a first arm of the bridge, $j$ is equal to $\sqrt{-1}$, $\omega$ is the alternating-current angular frequency, $R_b$ is a resistance disposed in a second arm of the bridge, $R_n$ is a first variable resistance disposed in a third arm of the bridge, and $R_p$ and $C_p$ are respectively a second variable resistance and a series-connected capacitance disposed in the fourth arm of the bridge, means for varying the first variable resistance $R_n$, means controlled by the variation of the first variable resistance $R_n$ for simultaneously varying the second variable resistance $R_p$ so as to maintain the product $$\left(\frac{1}{R_b R_n}\right) R_p$$

substantially constant, and means for varying the second variable resistance $R_p$ independently of variation of the first variable resistance $R_n$.

5. In a four-arm alternating-current bridge of the type that would normally provide a sliding-null balance condition and in which this balance condition is represented by the expression.

$$R_x - \frac{j}{\omega C_x} = \frac{R_a}{R_n}\left(R_p - \frac{j}{\omega C_p}\right)$$

where $R_x$ and $$\frac{j}{\omega C_x}$$

are respectively the real part and the imaginary part of an unknown impedance connected into a first arm of the bridge, $j$ is equal to $\sqrt{-1}$, $\omega$ is the alternating-current angular frequency, $R_a$ is a resistance disposed in a second arm of the bridge, $R_n$ is a first variable resistance disposed in a third arm of the bridge, and $R_p$ and $C_p$ are respectively a second variable resistance and a series-connected capacitance disposed in the fourth arm of the bridge, means for varying the first variable resistance $R_n$, means controlled by the variation of the first variable resistance $R_n$ for simultaneously varying the second variable resistance $R_p$ so as to maintain the product $$\left(\frac{R_a}{R_n}\right) R_p$$

substantially constant, and means for varying the second variable resistance $R_p$ independently of variation of the first variable resistance $R_n$.

6. In a bridge of the type that would normally measure an unknown complex impedance through sliding-null balance adjustments of a pair of variable impedances disposed in a corresponding pair of arms of the bridge, means for varying the impedance of one of the variable impedances, means controlled by the variation of the said one variable impedance for simultaneously varying the second variable impedance so as to maintain substantially constant a product having as terms the said impedances or reciprocals thereof, and means for varying the second variable impedance independently of variation of the first variable impedance.

7. In a bridge of the type that would normally measure an unknown complex impedance through sliding-null balance adjustments of a pair of variable resistances disposed in a corresponding pair of arms of the bridge, means for varying the resistance of one of the variable resistances, and differential means controlled by the variation of the said one variable resistance for simultaneously varying the second variable resistance so as to maintain constant a product having as terms the said resistances or reciprocals thereof, but for permitting variation of the second variable resistance independently of the variation of the first variable resistance.

8. A method of operating a bridge having first and second impedance arms, that comprises, varying the impedance of the first arm, dependently with such variation simultaneously varying the impedance of the second arm in a manner to maintain substantially constant a product having as terms the said arm impedances or reciprocals thereof, and varying the impedance of the second arm independently of variation of the impedance of the first arm.

9. A method of operating a bridge having first and second resistive arms, that comprises, substantially logarithmically varying the resistance of the first arm, dependently with such variation simultaneously substantially logarithmically varying the resistance of the second arm in a manner to maintain substantially constant a product having as terms the said arm resistances or reciprocals thereof, and varying the resistance of the second arm independently of variation of the resistance of the first arm.

10. In a four-arm alternating-current bridge of the type that would normally provide a sliding-null balance condition and in which this balance condition is represented by the expression $$R_x + j\omega L_x = \frac{R_n}{R_b}(R_p + j\omega L_p)$$

where $R_x$ and $j\omega L_x$ are respectively the real part and the imaginary part of an unknown impedance connected into a first arm of the bridge, $j$ is equal to $\sqrt{-1}$, $\omega$ is the alternating-current angular frequency, $R_b$ is a resistance disposed in a second arm of the bridge, $R_n$ is a first variable resistance disposed in a third arm of the bridge, and $R_p$ and $L_p$ are respectively a second variable resistance and a series-connected inductance disposed in the fourth arm of the bridge, means for varying the first variable resistance $R_n$, means controlled by the variation of the first variable resistance $R_n$ for simultaneously varying the second variable resistance $R_p$ so as to maintain the product $$\left(\frac{R_n}{R_b}\right) R_p$$

substantially constant, and means for varying the second variable resistance $R_p$ independently of variation of the first variable resistance $R_n$.

References Cited in the file of this patent
UNITED STATES PATENTS
2,437,355    Greenslade _____ Mar. 9, 1948